United States Patent Office
3,376,800
Patented Apr. 9, 1968

3,376,800
SUPPLEMENTARY SYSTEM FOR MIRROR REFLEX CAMERAS
Werner Faasch, Bienrode, near Braunschweig, Germany, assignor to Rollei-Werke Franke & Heidecke, Braunschweig, Germany, a German firm
Filed May 10, 1965, Ser. No. 454,250
Claims priority, application Germany, May 13, 1964, R 37,890; May 23, 1964, R 37,956
3 Claims. (Cl. 95—42)

ABSTRACT OF THE DISCLOSURE

An attachment for use with a photographic camera, especially a twin lens mirror reflex camera, comprises a hollow housing member for holding the camera at a definite distance from the object to be photographed, e.g., the image screen of an oscilloscope. A lateral extension on the housing member contains a transparency of a grid or other reference pattern, the image of which is to be superimposed on the image of the object, on the viewing screen of the camera and on the photographic film in the camera. An illuminating lamp of variable intensity illuminates the transparency so that the image thereof is projected through a lens and along a transverse axis intersecting the main optical axis extending from the object to the film in the camera. At the intersection of the two axes is a semi-transparent mirror reflecting part of the image of the reference pattern along the main axis toward the film, and allowing part of the image to pass through to a second mirror which reflects the reference pattern image into the viewfinder chamber of the camera. A variable power lens in the viewfinder optical axis compensates for the difference in length of path of rays to the film and to the viewfinder screen.

---

This invention relates to a supplementary system for use with mirror reflex cameras, for causing a grid or other desired reference pattern to be projected onto the film in the camera and also onto the viewing screen of the viewfinder. The invention is especially but not exclusively useful in connection with twin lens mirror reflex cameras.

An object of the invention is the provision of a generally improved and more satisfactory supplementary system of the above mentioned kind.

Another object is the provision of simple supplementary apparatus useful in observing and taking photographs of the patterns or images on the image screens of oscillographs, oscilloscopes, radar apparatus, television apparatus, X-ray apparatus, or other apparatus having image screens.

Still another object is the provision of such apparatus so designed that a desired reference pattern can be easily produced, either photographically or otherwise, and can be easily inserted into the supplementary apparatus and easily removed therefrom when changes in the reference pattern are desired, and can be projected at any desired brilliance of illumination so as to be visible to the observer and also projected onto the photographic film, so that when the subject pattern or image on the screen of the main apparatus is photographed, the desired reference pattern will also appear in the photograph in the desired relationship to the subject pattern or image, superposed thereon or otherwise placed as desired.

These and other desirable objects may be attained in the manner disclosed as an illustrative embodiment of the invention in the following description and in the accompanying drawings forming a part hereof, in which.

Figure 1:
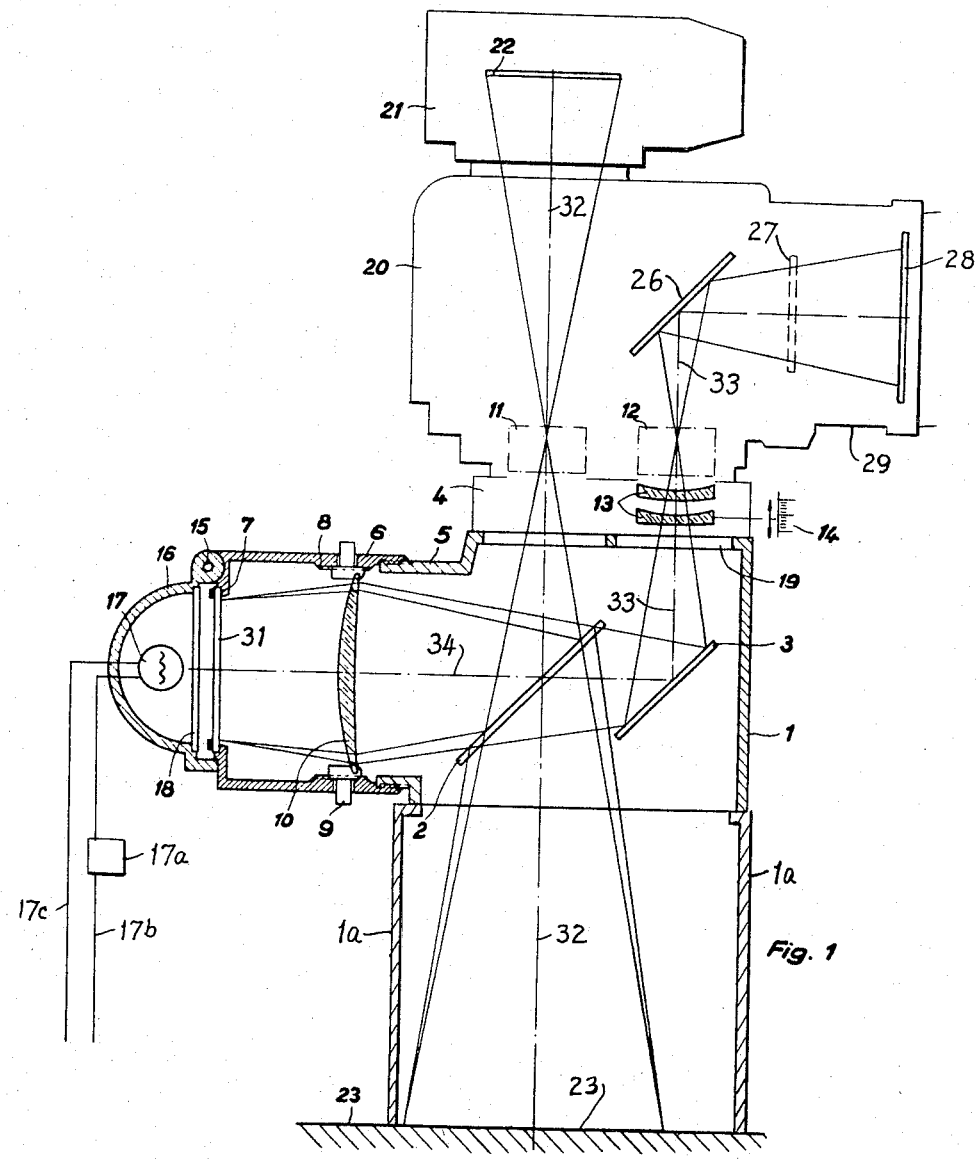
FIG. 1 is a somewhat schematic vertical section taken centrally through a preferred form of supplementary apparatus according to the present invention.

Referring now to FIG. 1, there is shown a preferred form of apparatus comprising a hollow housing 1 containing a semi-transparent or partially reflecting mirror 2 arranged at 45 degrees to the main optical axis 32, at the point where this axis intersects the transverse optical axis 34. Another mirror 3, parallel to the mirror 2 but offset from the cone of rays passing along the main axis, is at the point of intersection of the viewfinder optical axis 33 and the transverse optical axis 34. One side of the housing 1 (the lower side, when viewed as in FIG. 1) is open for entrance of light rays from the screen or other subject 23 whose images or indications are to be observed and photographed by the present apparatus. The opposite side of the housing (the top when viewed as in FIG. 1) is provided with suitable openings 19 for passage of light along the main optical axis 32 and the viewfinder optical axis 33.

On the housing 1 in surrounding relation to the openings 19 is an adapter or holder schematically shown at 4, for receiving and retaining a photographic camera of known kind, schematically shown at 20. Preferably the camera is a twin lens mirror reflex camera, a convenient camera of this kind being the well known "Rolleiflex" camera, which has a main or picture-taking lens indicated schematically at 11 and a viewfinder lens indicated schematically at 12, alined respectively with the main optical axis 32 and the viewfinder optical axis 33.

The apparatus of the present invention is usually but not always used at close-up distances with respect to the subject 23 which is to be observed and photographed. When used at crose-up distances, the regular camera back is removed and replaced by a supplementary or extension back 21, in order that the film plane 22 may be farther from the lens 11 than is possible with the regular back. The use of an extension back also has the advantage that it may be a "Polaroid Land" type of back, whereby an "instant" picture may be obtained. As usual in a twin lens mirror reflex camera, light entering along the viewfinder optical axis 33, through the finder lens 12, is reflected by the reflex mirror 26 onto the viewing screen, the regular normal position of which is shown at 27. However, when a supplementary back 21 is used for close-up work, an adjustment of the viewfinder image is needed. This can be done by shifting the viewing screen from the position 27 to a new position 28 farther from the lens 12, placing it in a supplementary focusing screen chamber 29 of known construction. For further information about known forms of supplementary backs and supplementary focusing screen chambers, see Faasch et al. Patent 3,174,418, granted Mar. 23, 1961.

The left side of the housing 1 (when viewed as in FIG. 1) opens through a large circular flange 5, externally threaded to receive internal threads on the tubular housing 6 of the supplementary optical system. In this housing 6 is the holder 7 for holding the transparency or picture 31 whose image is to be projected onto the film 22 and the viewing screen 28. The transparency or picture 31 is alined with the transverse optical axis 34. Also alined with the axis, between the picture 31 and the mirror 2, is the intermediate optical system schematically indicated at 10, adjustable axially on screw threads 8 by means of handles 9 extending radially outwardly through spiral slots in the housing 6. The intermediate optical system is preferably so calculated that, in combination with the camera lens 11, it produces an image on the film plane 22 of the same size as the original 31; in other words, a size ratio of 1:1. Of course other size ratios or scales may be used.

The transparency or photograph 31 may be called the reference member or the pattern. To the left of the pattern 31, the housing 6 has a hinge 15 on which is pivoted a closure cap 16 containing an illuminating lamp 17 for illuminating the pattern 31 through an intermediate diffusing member or ground glass screen 18. The brilliance or brightness of illumination is adjustable by means of a rheostat 17a in one of the circuit conductors 17b and 17c leading to the electric lamp 17.

A variable power negative lens 13 is located in the adapter 4, alined with the finder optical axis 33. Preferably the negative lens comprises two elements axially movable toward and away from each other for varying the power, the position of adjustment being read on the scale 14, the graduations of which are matched to the graduations of the focusing knob of the camera. This lens 13 serves to compensate for the lengthened path of the viewfinder rays as compared with the rays going to the film plane 22.

Figures 2, 3:
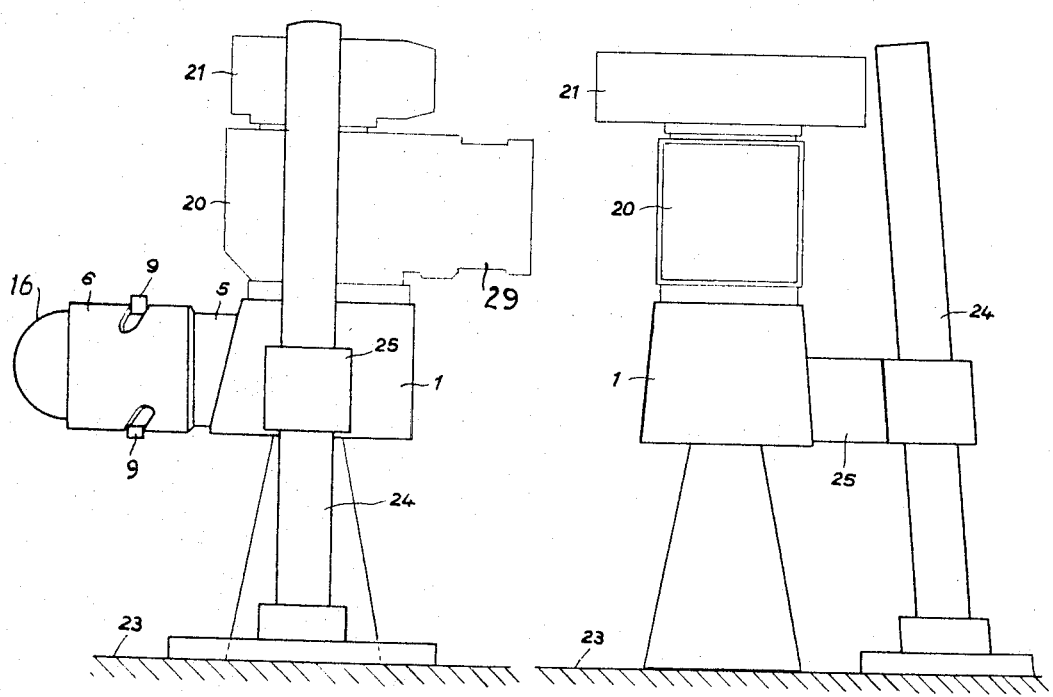
FIG. 2 is a side elevation of the same, viewed from the same direction as in FIG. 1.
FIG. 3 is an elevation of the same viewed from a direction at right angles to the direction of viewing in FIGS. 1 and 2.

As already intimated, the screen or other subject 23 may be any kind or sort of object or apparatus, the information from which is to be observed and photographed in comparison with or in correlation to the pattern 31. Thus the subject 23 may be a screen of television, radar, or X-ray apparatus, or of an oscilloscope, or it may be rather than a screen, a machine part or other actual physical object, either moving or stationary. Depending upon the nature of the subject 23 and the brightness of illumination thereof, the housing 1 may be spaced from the subject 23, or, if it is desirable to exclude stray light, the housing may have an extension 1a enclosing the area of the subject 23 which is to be observed and photographed. This extension 1a may be either integral with the rest of the housing 1, or a separate piece which can be used or not, as desired from time to time. The extension 1a may serve as a support for the housing 1. If the extension 1a is not used, the housing 1 and the parts carried thereby (i.e., the camera parts 20, 21 and the housing 6) may be supported by the upstanding post or pillar 24 and the bracket 25 extending laterally therefrom, as seen in FIGS. 2 and 3.

The reference pattern 31 may be a pattern drawn by hand (on a suitable sheet of transparent or translucent material) or reproduced photographically from an original which was drawn by hand, or it may be produced photographically from a pattern or object at the subject location 23, similar to the one which is to be investigated. For example, if one is investigating the oscilloscope response to a particular function or operation, the apparatus as here disclosed may be used to photograph the oscilloscope trace or pattern. If the photograph is taken on "Polaroid Land" type of negative film, a negative of the trace is available within a few seconds. Then this negative may be placed in the location 31 in the holder 7, and is used as the reference pattern for comparison with the new trace which is next observed at the subject location 23. Rays of light from the subject 23 pass upwardly to the mirror 2, where part of the light passes through the mirror and on upwardly to the camera lens 11 (and on into the camera when the shutter is open) and another part of the light is reflected by the mirror 2 rightwardly to the mirror 3, thence upwardly into the viewfinder system, where an image appears on the screen 28. At the same time, light from the reference pattern 31 passes through the lens 10 to the mirror 2, where part of the light is reflected upwardly toward the camera lens 11 and part passes through the mirror 2 to the mirror 3 and then is reflected into the viewfinder system. Thus the operator sees on the screen 28 the two superimposed images, one from the main subject 23, the other from the reference pattern 31. He can adjust the brightness of illumination to obtain the desired contrast between the two images. Thus he can compare the present operation shown at 23 with the previous similar operation recorded on the pattern 31. If the differences or similarities are significant and deserve to be permanently recorded, he operates the shutter of the camera 20, taking a photograph on the film 22. This photograph will show the two images, from 23 and 31, superimposed on each other, just as seen by the operator on the screen 28.

The above description of use is, of course, only a typical example. The reference pattern 31 does not need to be a photographic record of a previous operation at the location 23; it can be a simple grid, to be observed on the screen 28 and photographed on the film 22 is superimposed relation to the image of the new event or subject. It can be a "master" pattern, so marked as to show tolerances or permissible limits of variation. After observing (on the viewfinder screen 28) whether the subject at 23 does or does not fall within the allowable tolerance limits indicated on the reference pattern 31, the operator may take a photograph to provide permanent proof that the subject in question is within the tolerances or exceeds the tolerances, as the case may be.

The apparatus of the present invention is also very useful in the field of medicine. For example, an X-ray of a certain part of the human body, in normal condition, may be used as the reference pattern 31, while the subject at 23 may be an X-ray screen showing the same part of the same or different human body, in an abnormal or pathological condition. The operator may see on the screen 28 and may permanently record on the film 22 the normal and abnormal parts in superimposed relation to each other, thus greatly assisting in understanding the kind and degree of abnormality. The present invention therefore has great utility in many fields, wherever it is desired ot observe and to make a permanent photographic record of a thing or event or action in comparison to a reference pattern, whether the reference pattern be a previously made photographic reproduction of a similar thing or event or action, or whether it be an entirely different reference pattern such as a grid. It may be used, for example, in comparing a signature on a questioned document with a reproduction of an admittedly genuine signature of the same person, or in comparing an aircraft navigational movement on a radar screen with a standard or approved flight path shown on a refernece pattern, or in countless other circumstances where comparisons may be desirable.

In the preferred form, the mirror 2 is half-silvered or semi-transparent, as above stated, so that the entire area of the subject at 23 and the entire area of the reference pattern 31 will be projected both onto the screen 28 and (when the camera shutter is open) onto the film 22. However, it is within the scope of the invention to modify the mirror 2 according to known optical principles (e.g., the principles used in the optical systems of split- field rangefinders) to produce any desired special effects, such as having only the image of the subject 23 appear in the central part of the screen 28 and the film 22, and having only the image of a reference pattern (e.g., the margin of a clock dial and the outer ends of the hands of a clock) appear in a margin surrounding the central image, both on the screen 28 and the film 22. Also, the source of the reference pattern need not be a fixed or stationary source, such as the pattern 31 in the holder 7, but may be a screen having a moving pattern on it, or a comparison article similar to the subject being observed at 23. For example, the closure cap 16 may be removed and the open end of the supplementary housing 6 may be pointed toward a second screen or article similar to that at 23, whereby the apparatus may be used to observe and photograph a comparison of the simultaneous operation of the two articles or things which are being studied.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:
1. A portable supplementary optical system adapted to be moved from one subject to another, for use with a mirror reflex camera to enable a selected subject and a separate reference pattern spaced from the subject to be observed and photographed in overlapping relation to each other, said supplementary system comprising portable holding means separate from and readily movable with respect to a subject for holding a camera in a position with a picture taking optical axis of the camera alined with the subject, tubular means extending laterally with respect to said picture taking axis for holding a reference pattern in laterally offset position with respect to said axis, a lens in said tubular means, rotatable adjustment means on said tubular means effective on rotation to adjust the distance between said lens and said reference pattern, and a semi-transparent mirror mounted in said holding means and extending obliquely across said picture taking axis in position to receive light coming from said reference pattern through said lens and reflect at least part of such light along said picture taking axis toward the camera while at least part of the light from said subject passes through said mirror and thence along said picture taking axis toward the camera.

2. A photographic camera attachment for facilitating the simultaneous observation and photographing of a subject in conjunction with a reference pattern superimposed thereon, said attachment comprising a hollow tubular housing open at two opposite ends, one open end being adapted to receive a twin lens mirror reflex camera in such position that a main photographic axis of the camera extends through said tubular housing from one open end to the other open end thereof and a viewfinder optical axis arranged parallel to said main photographic axis also extends into said tubular housing, the opposite open end of said tubular housing being adapted to be removably placed against a surface adjacent to the subject to be photographed and in surrounding relation to the subject, a lateral extension on said tubular housing, an illuminating lamp at the end of said lateral extension remote from said main photographic axis, a holder for holding a transparency of a reference pattern in a plane substantially parallel to said main photographic axis and near said lamp in position to be illuminated thereby, adjustable projection lens means in said lateral extension between said holder and said main photographic axis and positioned to project an image of said reference pattern along a lateral axis intersecting and substantially perpendicular to both said main photographic axis and said viewfinder optical axis, a mirror mounted within said tubular housing substantially at the intersection of said lateral axis with said viewfinder axis and angled to deflect light rays passing from said reference pattern along said lateral axis to pass along said viewfinder axis toward said camera, and a semi-transparent mirror also mounted within said tubular housing substantially at the intersection of said lateral axis with said main photographic axis and angled to deflect part of the light rays passing from said reference pattern along said lateral axis to pass along said main photographic axis toward said camera and permitting another part of the light rays from said reference pattern to pass through said semi-transparent mirror to said first mentioned mirror.

3. A construction as defined in claim 2, further including, in combination with said attachment, a camera back extension for holding film in a position intersecting said main photographic axis and at a greater distance from said semi-transparent mirror than the normal position of film within said camera, and a viewfinder extension for holding a viewfinder screen at a corresponding greater optical distance from said first mentioned mirror than the normal position of a viewfinder screen within said camera.

References Cited
UNITED STATES PATENTS

| | | | |
|---|---|---|---|
| 2,339,377 | 1/1944 | Clark | 95—1.1 X |
| 2,891,439 | 6/1959 | Lee | 95—1.1 X |
| 2,963,950 | 12/1960 | Faasch | 95—44 |
| 3,111,887 | 11/1963 | Alexander | 95—1.1 |

JOHN M. HORAN, *Primary Examiner.*

NORTON ANSHER, *Examiner.*